United States Patent [19]

Johnson et al.

[11] Patent Number: 5,408,594
[45] Date of Patent: Apr. 18, 1995

[54] METHOD AND APPARATUS FOR VISUAL ACCENTUATION OF DISPLAYED INFORMATION

[75] Inventors: William J. Johnson, Flower Mound; Robert S. Keller, Grapevine; Marvin L. Williams, Lewisville, all of Tex.

[73] Assignee: International Business Machines Corp., Armonk, N.Y.

[21] Appl. No.: 943,849

[22] Filed: Sep. 11, 1992

[51] Int. Cl.⁶ .............................................. G06F 15/62
[52] U.S. Cl. .................................... 395/133; 395/145; 395/147
[58] Field of Search .............................. 395/133–135, 395/131, 132, 145, 147, 109; 364/DIG. 1

[56] References Cited

U.S. PATENT DOCUMENTS 4,857,955  8/1989  Crandall ......................... 395/109 X
4,872,167 10/1989  Maezawa et al. ............. 364/DIG. 1

*Primary Examiner*—Almis Jankus
*Attorney, Agent, or Firm*—N. L. Gundel

[57] ABSTRACT

A data processing system determines the relative frequency of occurrence in a specified file object of two specified classes of display objects and displays the contents of the file object accentuating display objects of the class having the desired relative frequency of occurrence. Relative frequency of occurrence may be determined by number of occurrences of display objects within each of the two classes or by determining a weight for each display object of each of the two classes. Relative frequency of occurrence may be computed either by separately summing or by computing the difference of either the number of objects or the weight of objects of the two classes.

8 Claims, 3 Drawing Sheets

METHOD AND APPARATUS FOR VISUAL ACCENTUATION OF DISPLAYED INFORMATION

BACKGROUND OF THE INVENTION

1. Field of the Invention

The present invention relates to the display of information by electronic data processing systems and in particular to an electronic data processing system that accentuates displayed objects.

2. Description of the Related Art

Many data processing systems provide a user interface that can accentuate certain, but not all, display objects that are presented to the user. Examples of accentuated display objects include: search terms within text, negative numbers, misspelled words within text as determined by a spellchecking procedure, and unavailable system resources in a list of data processing system resources.

Accentuation may also be called highlighting or emphasis. Accentuation of displayed objects may be provided in different manners on different data processing systems. On a TTL character mode monochrome display monitor displaying normal intensity display objects such as letters, numbers and other displayable characters, the display of accentuated display objects may include high intensity or bold, reverse video, a different font such as an italic font, or blinking. On a graphical display, accentuation may be similarly applied to icons and other graphical display objects. On a color display, accentuation of display objects may additionally include a higher intensity of the same color in which the unaccentuated display objects are presented, a different color, or a different color background.

The accentuation examples listed above may, but are not required to be, binary: either a word is misspelled or it is not. In binary accentuation decisions, data processing systems or applications may accentuate one class of display objects. Some applications allow a customized selection of the class of display objects to be accentuated. For example, an application showing accounting transactions may allow the user to select whether debit entries or credit entries are accentuated. Additionally, accentuation may be applied where more than two classes of display objects are available for accentuation: a text document may contain not only misspelled words and correctly spelled words but also numbers.

Accentuation may be enabled so that the accentuated display objects are differentiated from the remaining display objects. However, when a majority of the display objects are accentuated, an unfortunate "dazzle" effect may be created. When a majority of the display objects are accentuated, the stand-out effect of the accentuation may be substantially lessened. Furthermore, the unaccentuated minority of the display objects may be overshadowed. A user may prefer to accentuate relatively less frequently occurring classes of display objects to minimize the "dazzle" effect. Alternatively, a user may prefer to accentuate relatively more frequently occurring classes of display objects to take advantage of the "dazzle" effect.

Manual user selection may allow the user to redesignate the accentuation to the preferred relatively less common or more common class of display object. However, repeated manual user selection may be necessary whenever the relative frequency of occurrence of display objects changes. Such repeated user selection may inconvenience a user. A method and apparatus are desired in which a data processing system may accentuate a class of display objects, in response to the relative frequency of occurrence of the class of display objects, with a minimum of user intervention.

SUMMARY OF THE INVENTION

In accordance with the method and apparatus of the present invention, a data processing system determines the relative frequency of occurrence in a specified file object of two specified classes of display objects and displays the contents of the file object accentuating display objects of the class having the desired relative frequency of occurrence. Relative frequency of occurrence may be determined by number of occurrences of display objects within each of the two classes or by determining a weight for each display object of each of the two classes. Relative frequency of occurrence may be computed either by separately summing or by computing the difference of either the number of objects or the weight of objects of the two classes.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as defined by the appended claims.

DETAILED DESCRIPTION OF THE PREFERRED EMBODIMENT

Figure 1:
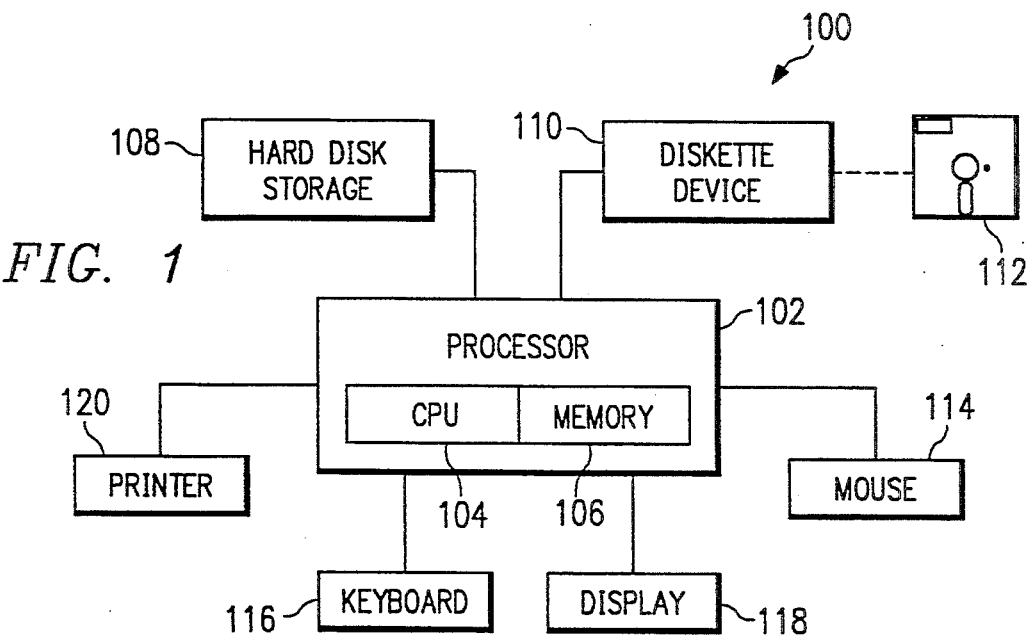
FIG. 1 is a block diagram of a data processing system used in performing the method of a preferred embodiment of the present invention and forming a part of the apparatus of a preferred embodiment of the present invention.

With reference now to the Figures, and in particular with reference to FIG. 1, there is shown, in block diagram form, a data processing system 100 according to the present invention. The data processing system 100 includes a processor 102, which includes a central processing unit (CPU) 104 and memory 106. Additional memory, such as a hard disk file storage 108 and a floppy disk device 110, may be connected to the processor 102. Floppy disk device 110 may receive removable diskette 112 which may have computer program code recorded thereon that implements the present invention in the data processing system 100. The data processing system 100 may include user interface hardware, such as a mouse 114 and a keyboard 116, for allowing user input to the processor 102. The data processing system also includes a display such as a monochrome or color display monitor 118 and a monochrome or color display printer 120 for presenting visual data to the user.

Figure 2A:
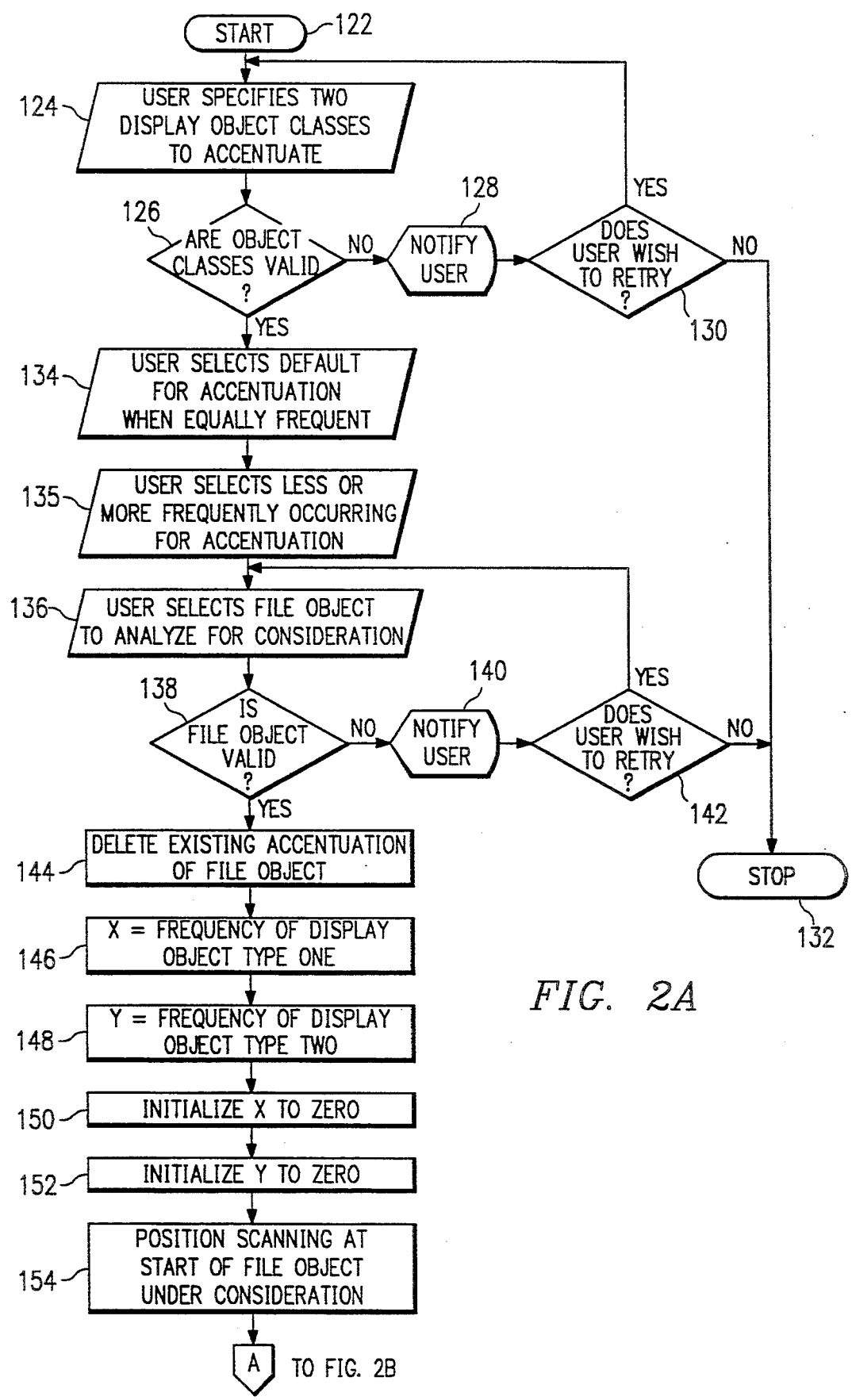
FIGS. 2A and 2B are a high level logic flow chart illustrating the method of a preferred embodiment of the present invention.
Figure 2B:
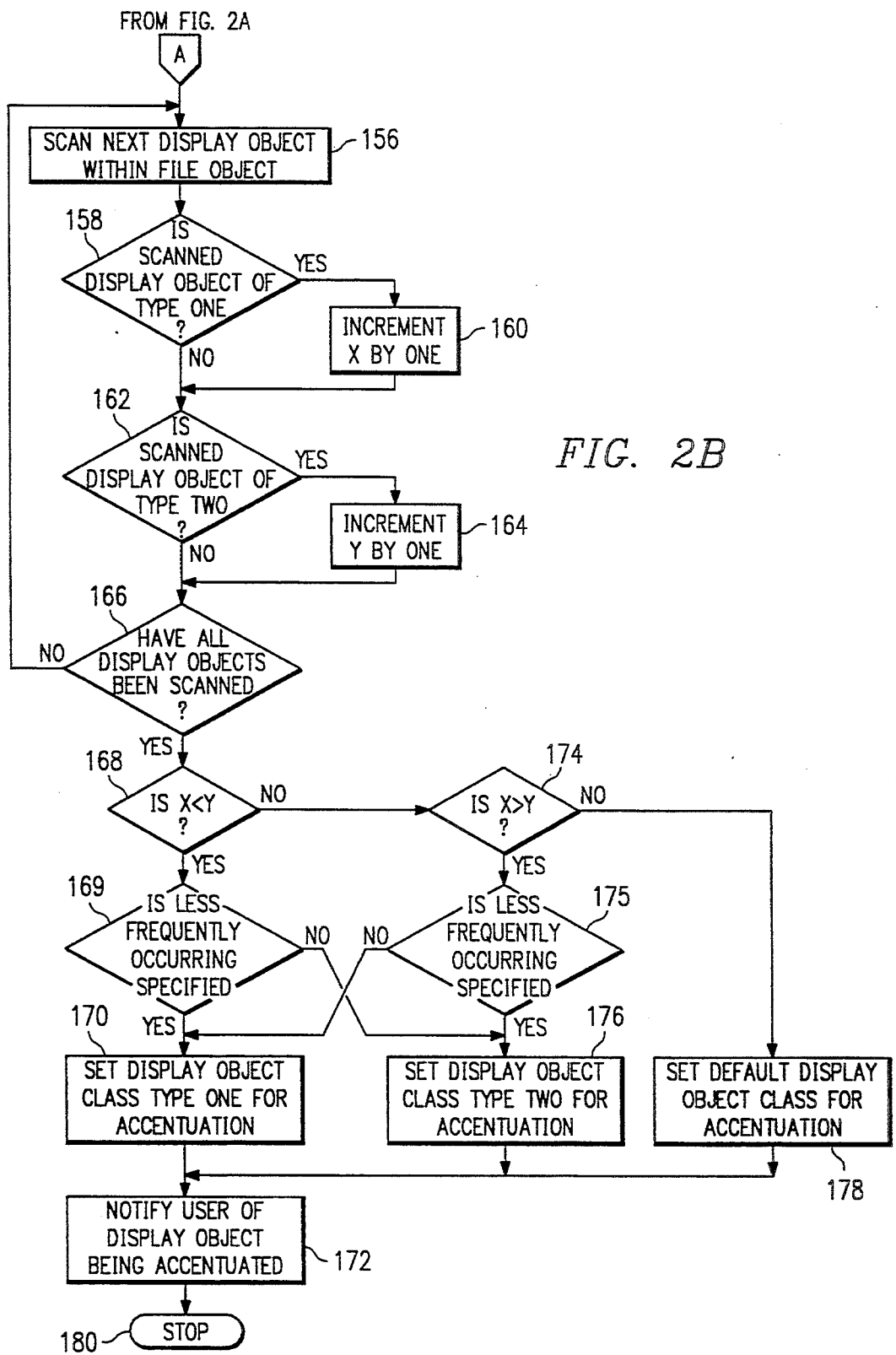

With reference now to FIGS. 2A and 2B, there is depicted a high level logic flow chart which illustrates the method of the present invention. The process begins at block 122 and proceeds to block 124, in which the user specifies two classes of display objects as eligible for accentuation. These two classes of display objects are referred to herein as Type 1 and Type 2. Examples of such classes of display objects are misspelled words and correctly spelled words in a text document, positive and negative numbers in a spreadsheet or debit objects and credit objects in financial records. The process next proceeds to block 126 for a determination of whether the classes of display objects selected in block 124 are valid. To be valid, the data processing system should be able to distinguish each of the classes of display objects. For example, misspelled words would not be a valid class of display objects if the data processing system lacked the capacity to detect misspelled words. Additionally, the two classes of display objects selected may preferably be related to each other by a logical "not" relationship. For example, in a text document, the selection of the two classes of display objects, misspelled words and correctly spelled words, may be valid, whereas the selection of the two classes of display objects, misspelled words and numbers, may not be valid, as there is no logical "not" relationship between misspelled words and numbers.

If the data processing system determines that the classes of display objects are not both valid, the process proceeds to block 128 in which the user is notified of the determination. The process next proceeds to block 130 in which the user specifies whether he wishes to re-try the specification of two classes of display objects. If the user wishes to re-try, the process proceeds from block 130 to block 124, as described above. If the user does not wish to re-try, the process proceeds from block 130 to block 132 and terminates.

Returning now to block 126, as described above, if the system determines that the two classes of display objects specified in block 124 are both valid, the process proceeds from block 126 to block 134. There, the user selects which of the two specified classes of display objects should be accentuated by default if the process does not select between the two classes of display objects specified. Alternatively, the process may select, or default to, the first of the two classes of display objects specified. Next the process proceeds to block 135, in which the user specifies whether the less frequently occurring class or the more frequently occurring class is to be accentuated.

Next the process proceeds to block 136, in which the user specifies the file object to be analyzed. This file object may for example be a text document to be analyzed for misspelled words or a financial document including both debit items and credit items. A file object may also be a portion of such a document, such as a single screen. The process next proceeds to block 138 in which it is determined whether the selected file object is valid. Validity criteria may include, for example, whether the file object is available to the data processing system and whether the file object contains the two classes of display objects selected in block 124.

If the system determines that the file object selected in block 136 is not valid, the process proceeds from block 138 to block 140 and notifies the user. The process next proceeds to block 142 in which the user is given the option to re-try selection of an object for analysis. If yes, the process proceeds from block 142 to block 136 as described above. If the user does not wish to re-try, the process proceeds from block 142 to block 132 and terminates.

In the process as described, the user first specifies the classes of display objects, then the file object. However, the order of this specification may be reversed.

Returning to block 138, if the data processing system determines that the file object specified in block 136 is valid, the process proceeds from block 138 to block 144. In block 144, any existing accentuation may be deleted from the file object. The process next proceeds to block 146 and defines the variable X as the frequency of occurrence in the file object of the user selected class of display objects Type 1. The process next proceeds to block 148 and defines the variable Y as the frequency of occurrence in the file object of the user selected class of display objects Type 2. The process next proceeds to block 150 and initializes the variable X to zero. The process next proceeds to block 152 and initializes the variable Y to zero.

The process next proceeds to block 154 and positions itself for scanning to begin at the start of the specified file object. Alternatively, the process may be position itself at the end of the file, for scanning backward through the file, or at some other preferred entry point, such as after a file header. A preferred entry point may be determined on the basis of the architecture of the file object.

Turning now to FIG. 2B, the process next proceeds to block 156 and scans the first or next display object within the file object under consideration. The process next proceeds to block 158 for a determination of whether the scanned display object is of Type 1. If yes, the process proceeds to block 160 and increments the variable X by one. From block 160 the process proceeds to block 362. Returning to block 158, if the scanned display object is not of Type 1, the process proceeds directly from block 158 to block 162.

In block 162, the process determines whether the scanned display object is of Type 2. If yes, the process proceeds to block 164 and increments the variable Y by one. From block 164 the process proceeds to block 166. Returning to block 162, if the scanned display object is not of Type 2, the process proceeds from block 162 directly to block 166.

The process permits a display object to be either Type 1 or Type 2, in which event the process determines whether the object will be accentuated. The process also accommodates a display object that is neither Type 1 nor Type 2, which will not be accentuated, and also a display object that is both Type 1 and Type 2, which will be accentuated.

Alternatively, a single variable may be used. Block 160 may increment the single variable if the object scanned is Type 1 and block 164 may decrement the single variable if the object scanned is Type 2.

Alternatively, the variables X and Y, or the single variable if used, may be incremented or decremented by a value other than one. In this alternate manner, individual display objects may be given different "weights" in the frequency of occurrence determination. Different weights may, for example, be given to shorter or longer words by incrementing or decrementing by the numbers of letters in each word. Individual characters or objects may be assigned different weights: an "m" may have a greater weight than an "i." Different weights may be given to larger or smaller icons as by incrementing or decrementing by the number of pixels enclosed in the icon or by the number of pixels illuminated. Thus, frequency of occurrence may measure the number of occurrences or some other property, preferably visually related such as number of letters or number of pixels illuminated, which need not be the same as the number of occurrences.

Returning to FIG. 2B in block 166, the process determines whether all of the display objects within the file object have been scanned. If no, the process proceeds from block 166 to block 156, described above, and scans the next display object within the file object under consideration.

Returning to block 166, if the process determines that all display objects within the file object have been scanned, the process proceeds from block 166 to block 168, where the process determines whether the variable X is less than the variable Y. If yes, the process proceeds from block 168 to block 169 for a determination of whether "less frequently occurring" was specified in block 135 described above. If yes, the process proceeds from block 169 to block 170 and sets the class of display objects Type 1 for accentuation and then proceeds to block 172. If no, the process proceeds from block 169 to block 176 and sets the class of display objects Type 2 for accentuation and then proceeds to block 172.

Returning to block 168, if the process determines that the variable X is not less than the variable Y, the process proceeds from block 168 to block 174 and determines whether the variable X is greater than the variable Y. If yes, the process proceeds from block 174 to block 175 for a determination of whether "less frequently occurring" was specified in block 135. If yes, the process proceeds from block 175 to block 176 as described above. If no, the process proceeds from block 175 to block 170 as described above.

Returning to block 174, if the process determines that the variable X is not greater than the variable Y, the process proceeds from block 174 to block 178 and sets the default class of display objects specified by the user in block 136 for accentuation. The process next proceeds from block 178 to block 172. In block 172, the process may notify the user which class of display objects is being accentuated and then proceeds to block 180 and terminates.

If a single variable is used, block 168 tests whether the single variable is less than zero and block 174 tests whether the single variable is greater than zero.

In use, a user of the data processing system specifies the two classes of display objects eligible for accentuation, chooses one of them as a default, specifies relatively "less" or "more" frequently occurring, and specifies the file object to be analyzed. The disclosed data processing system, performing the disclosed method, selects between the user specified classes of display objects and displays the file object with the specified relatively "less" or "more" frequently occurring display object accentuated.

Upon reference to the foregoing, it will be appreciated that the applicants have provided a novel and useful method and apparatus for visual accentuation of displayed information. While the invention has been particularly shown and described with reference to a preferred embodiment and process, it will be understood that various changes in form and detail may be made therein without departing from the spirit and scope of the invention.

What is claimed is:

1. A method of accentuating display objects displayed by a data processing system, said display objects being contained within a file object residing in the data processing system, with each of the display objects being a member of a class and with the contents of the file object including display objects of at least two classes, the method comprising the steps, performed in a data processing system, of:
    determining frequencies of occurrence in the file object of the two classes of display objects;
    comparing the frequencies of occurrence within the file object of the two classes of display objects, wherein the step of determining frequencies of occurrence in a file object of two classes of display objects includes the step of counting the number of occurrences, within the file object, of display objects of each of the two classes;
    displaying the contents of the file object; and
    accentuating display objects of the class having a specified greater or lesser frequency of occurrence.

2. A method of accentuating display objects displayed by a data processing system, said display objects being contained within a file object residing in the data processing system, with each of the display objects being a member of a class and with the contents of the file object including display objects of at least two classes, the method comprising the steps, performed in a data processing system, of:
    determining frequencies of occurrence in the file object of the two classes of display objects, wherein the step of determining frequencies of occurrence in a file object of two classes of display objects includes the step of associating a weight with each display object of either of the two classes;
    comparing the frequencies of occurrence within the file object of the two classes of display objects;
    displaying the contents of the file object; and
    accentuating display objects of the class having a specified greater or lesser frequency of occurrence.

3. The method of claim 2 wherein the step of determining frequencies of occurrence in a file object of two classes of display objects includes the step of separately summing the weights of the display objects of each of the two classes.

4. The method of claim 2 wherein the step of determining frequencies of occurrence in a file object of two classes of display objects includes the step of computing the difference in the cumulative weights of the display objects of each of the two classes.

5. A data processing apparatus for accentuating display objects, said display objects being contained within a file object residing in the data processing apparatus, with each of the display objects being a member of a class and with the contents of the file object including display objects of at least two classes, comprising:
    means for determining frequencies of occurrence in the file object of the two classes of display objects, wherein the means for determining frequencies of occurrence in a file object of two classes of display objects includes means for counting the number of occurrences, within the file object, of display objects of each of the two classes;
    means for comparing the frequencies of occurrence within the file object of the two classes of display objects;

means for displaying the contents of the file object; and means for accentuating display objects of the class having a specified greater or lesser frequency of occurrence.

6. A data processing apparatus for accentuating display objects, said display objects being contained within a file object residing in the data processing apparatus, with each of the display objects being a member of a class and with the contents of the file object including display objects of at least two classes, comprising:

means for determining frequencies of occurrence in the file object of the two classes of display objects, wherein the means for determining frequencies of occurrence in a file object of two classes of display objects includes means for associating a weight with each display object of either of the two classes;

means for comparing the frequencies of occurrence within the file object of the two classes of display objects;

means for displaying the contents of the file object; and means for accentuating display objects of the class having a specified greater or lesser frequency of occurrence.

7. The apparatus of claim 6 wherein the means for determining frequencies of occurrence in a file object of two classes of display objects includes means for separately summing the weights of the display objects of each of the two classes.

8. The apparatus of claim 6 wherein the means for determining frequencies of occurrence in a file object of two classes of display objects includes means for computing the difference in the cumulative weights of the display objects of each of the two classes.

* * * * *